(12) United States Patent
Slattery

(10) Patent No.: US 9,772,636 B2
(45) Date of Patent: Sep. 26, 2017

(54) POWER SUPPLY CONTROL

(75) Inventor: Colm F. Slattery, Clonmel (IE)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/532,931

(22) Filed: Jun. 26, 2012

(65) Prior Publication Data

US 2013/0342177 A1    Dec. 26, 2013

(51) Int. Cl.
*H02M 3/156*    (2006.01)
*G05F 1/46*    (2006.01)
*H02M 1/00*    (2006.01)

(52) U.S. Cl.
CPC ............... *G05F 1/46* (2013.01); *H02M 1/00* (2013.01); *H02M 3/156* (2013.01); *H02M 2003/1566* (2013.01)

(58) Field of Classification Search
CPC ......... H02M 3/156; H02M 2001/0003; H02M 2003/1566; H02M 2001/0009; H02M 2001/0032; H02M 1/32; H02M 1/36; H02M 3/157; H02M 3/335; H02M 3/33507; H02M 3/33515; H02M 3/337; H02M 3/3376; G05F 1/10; G05F 1/46; G01R 27/14
USPC .......................... 323/234, 282–285; 324/525
See application file for complete search history.

(56) References Cited

U.S. PATENT DOCUMENTS

| | | | | |
|---|---|---|---|---|
| 7,187,157 B1* | 3/2007 | Dix | ........................... | H02J 1/14 323/271 |
| 7,441,137 B1 | 10/2008 | Mimberg | ...................... | 713/340 |
| 7,456,618 B2* | 11/2008 | Jain et al. | ...................... | 323/272 |
| 8,159,229 B2* | 4/2012 | Akke et al. | ..................... | 324/525 |
| 2005/0060109 A1 | 3/2005 | Caffrey et al. | .................. | 702/65 |
| 2006/0092672 A1* | 5/2006 | Cho | ........................ | H02M 1/32 363/21.01 |
| 2009/0121908 A1* | 5/2009 | Regier | ............... | G01R 31/2841 341/142 |

(Continued)

FOREIGN PATENT DOCUMENTS

| DE | 100 20 927 A1 | 1/2002 | |
|---|---|---|---|
| EP | 0 136 207 | 4/1985 | ............. G01R 31/28 |

(Continued)

OTHER PUBLICATIONS

Analog Devices, Inc., Quad Channel, 16-Bit, Serial Imput, 4 mA to 20 mA and Voltage Output DAC, Dynamic Power Control, HART Connectivity, Data Sheet, AD5755-1, 52 pages, 2011.

(Continued)

*Primary Examiner* — Emily P Pham
*Assistant Examiner* — Shahzeb K Ahmad
(74) *Attorney, Agent, or Firm* — Wolf, Greenfield & Sacks, P.C.

(57) ABSTRACT

Controlling the output voltage of a power supply involve determining a remote load coupled to the power supply and setting the output voltage based on the determined remote load and a predetermined maximum current for the power supply. The remote load may be measured, for example, by applying a predetermined current to the load, measuring the voltage across the load, and computing the effective load (resistance) value based on the supplied current and the measured voltage. Such measurement may be done using an analog-to-digital converter.

20 Claims, 4 Drawing Sheets

(56) References Cited

U.S. PATENT DOCUMENTS

| | | | | |
|---|---|---|---|---|
| 2010/0237838 A1* | 9/2010 | Templeton | ............ | H02M 3/157 |
| | | | | 323/271 |
| 2012/0007562 A1* | 1/2012 | Yang | .............................. | 320/128 |
| 2012/0049808 A1* | 3/2012 | Nakai | ............................ | 323/234 |
| 2012/0217946 A1* | 8/2012 | Ju | .................................. | 323/285 |
| 2013/0049712 A1* | 2/2013 | Ueno | ................... | H02M 3/1584 |
| | | | | 323/234 |

FOREIGN PATENT DOCUMENTS

| | | | | |
|---|---|---|---|---|
| EP | 0 952 497 A1 | 10/1999 | ............. | G03G 15/16 |
| EP | 2043242 | 4/2009 | ............. | H02M 1/42 |
| GB | 2484524 | 4/2012 | ............. | H02M 1/08 |
| JP | S60-100065 | 6/1985 | ............. | G01R 31/28 |
| JP | H11-305565 | 11/1999 | ............. | G03G 15/16 |
| JP | 2008-076085 | 4/2008 | ............. | G01R 31/28 |
| JP | 2008-232636 | 10/2008 | ............. | G01R 31/26 |
| JP | 2010-119041 | 5/2010 | ............. | H03F 3/34 |
| JP | 2010-147277 | 7/2010 | ............. | H01L 21/86 |
| WO | WO2012038579 | * 3/2012 | | |

OTHER PUBLICATIONS

Analog Devices, Inc., The Fundamentals of LDO Design and Application, 2 pages, 2009.

Gavardoni, Maurizio, Load-Power Monitor Improves High-Side Current Measurements, Maxim, Application Note 4507, 3 pages, Nov. 8, 2010.

www.hparchive.com, Tech Letter #3, Measurement of Line and Load Regulation of DC Power Supplies, 8 pages, Dec. 16, 1964.

Linear Technology, LTC3880/LTC3880-1, Dual Output PolyPhase Step-Down DC/DC Controller with Digital Power System Management, 112 pages, 2011.

International Searching Authority, International Search Report—International Application No. PCT/US2013/047532, dated May 9, 2014, together with the Written Opinion of the International Searching Authority, 11 pages.

Japanese Patent Office, Office Action: Notice of Reasons for Rejection—Application No. 2015-520387, dated Nov. 30, 2015, 3 pages (English translation).

German Patent and Trademark Office, Office Action—German Patent Application No. 11 2013 003 373.2, dated Mar. 10, 2017, 6 pages (English translation).

\* cited by examiner

POWER SUPPLY CONTROL

FIELD OF THE INVENTION

The present invention relates generally to power supply control, and, more particularly, so setting the output voltage of a power supply based on the actual remote load.

BACKGROUND OF THE INVENTION

When driving a current output (e.g., 4-20 mA current), a minimum compliance voltage, and therefore supply, is needed. In a fixed power controller, the compliance voltage is typically set to a fixed voltage based on a predetermined maximum load and the maximum current that will be driven into that load. As the current output converter does not know the load, the power supply compliance (and therefore the power supply) needs to be large enough to cover the whole load range. If the actual load is less than the maximum, then the excess power would get dissipated on the power controller and in the housing of the driving device. Typically, the compliance voltage is set to the minimum compliance voltage required plus a small headroom voltage, e.g., 2V.

When operating in a current output mode, a converter with dynamic power control capability such as the AD5755 family of devices sold by Analog Devices, Inc. of Norwood, Mass. can be configured to sense the needed output compliance voltage and to dynamically change the power supply voltage to meet compliance requirements, e.g., using an on-board DC-DC boost converter to modulate the power supply as needed. For example, using the formula VOUTmin=IOUTact×RLOADmax (where VOUTmin is the minimum required output voltage, IOUTact is the actual current output, and RLOADmax is the maximum remote load), if RLOADmax=1 Kohm and IOUTact=10 mA, then VOUTmin=10V; but if RLOADmax=1 Kohm and IOUTact=20 mA, then VOUTmin=20V. Typically, the output voltage of the power supply is set to VOUTmin plus a small headroom voltage, e.g., 2V. Such dynamic power control is discussed, for example, in The Analog Devices AD5755-1 Data Sheet Rev. B (2011) available at www.analog.com/static/imported-files/data_sheets/AD5755-1.pdf, which is hereby incorporated herein by reference in its entirety. Among other things, such dynamic power control using a dc-to-dc boost converter circuit reduces power consumption compared to standard designs when using the part in current output mode.

One drawback of such dynamic power control is that, as the power supply is modulated directly from the current draw, if large output swings are needed, the settling time of the current output can become very large, especially when driving into high load values. Thus, while such dynamic power controllers tend to improve power dissipation, they often do so at the expense of the settling time.

SUMMARY OF EXEMPLARY EMBODIMENTS

In certain exemplary embodiments, a converter for controlling the output voltage of a power supply includes a measuring circuit and a controller in communication with the measuring circuit, the controller configured to determine a remote load coupled to the converter based on a known current output applied to the remote load and measurements received from the measuring circuit, the controller further configured to set an output voltage of the power supply based on the determined remote load and a predetermined maximum current.

In various alternative embodiments, the converter also may include a current source, wherein the controller is configured to cause the current source to apply a known current to the remote load and to determine the remote load based on the known current and voltage measurements received from the measuring circuit. The measuring circuit may include an analog-to-digital converter configured to provide measurement values to the controller, or the measuring circuit may be configured to provide voltage measurements or load values to the controller. In some embodiments, the converter may include the power supply, which may include, for example, a DC-DC converter and/or a power regulator. In such embodiments, the measuring circuit, the controller, and the power supply may be on a single chip. In various embodiments, setting the output voltage of the power supply based on the remote load and a predetermined maximum current may involve storing a value used to control the power supply. The controller may be further configured to repeatedly re-determine the remote load and set the output voltage of the power supply based on the re-determined remote load. The controller may be further configured to interface with an external processor for providing measurement information to the external processor and receiving from the external processor a parameter used to control the power supply such that the output compliance voltage is selectively user-programmable.

In other exemplary embodiments, a method of setting a power supply output voltage for a remote load involves determining the remote load by a controller and setting the power supply output voltage by the controller based on the determined remote load and a predetermined maximum current for the power supply.

In various alternative embodiments, determining the remote load may involve applying a known current to the remote load, measuring voltage across the remote load produced by the current, and determining the remote load based on the known current and the measured voltage. Determining the remote load may involve use of an analog-to-digital converter. The power supply may include a DC-DC converter and/or a power regulator on the same chip as the controller. Setting the output voltage of the power supply based on the remote load and a predetermined maximum current may involve storing a value used to control the power supply. The method may further involve repeatedly re-determining the remote load and setting the output voltage of the power supply based on the re-determined remote load by the controller.

In other exemplary embodiments, a system for controlling the output voltage of a power supply includes a converter and an external processor in communication with the converter, wherein at least one of the converter or the external processor is configured to determine a remote load coupled to the converter and to set an output voltage of the power supply based on the determined remote load and a predetermined maximum current.

Additional embodiments may be disclosed and claimed.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In embodiments of the present invention, the previously unknown load (referred to herein as the "remote load" or "RLOAD") is measured and the power supply is set to only deliver the required maximum supply for that load (i.e., VOUTmin=IOUTmax×RLOADact, where VOUTmin is the minimum required output voltage, IOUTmax is the maximum required current output, and RLOADact is the actual sensed remote load), as opposed to the maximum supply for all loads. Then, the power supply voltage is set based on the actual sensed remote load and the maximum required current output. Thus, for example, if RLOADact=300 ohm and IOUTmax=20 mA, then VOUTmin=6V regardless of the actual current output and regardless of the maximum load supported by the power supply. Typically, the output voltage of the power supply is set to VOUTmin plus a small headroom voltage, e.g., 2V. By doing this, power dissipation is kept low while the settling time is substantially reduced because the compliance voltage does not need to change when a current change is effectuated.

The remote load may be measured, for example, by applying a predetermined current to the load (which may be the known current applied to the load during operation of the device), measuring the voltage across the load, and computing the effective load (resistance) value based on the supplied current and the measured voltage. For example, if a current of 5 mA is applied to the load and the measured voltage is 1.5V, then RLOAD=300 ohm (i.e., R=V/I). Such measurement of the voltage may be done using an analog-to-digital converter (ADC) or other mechanism such as analog circuitry (e.g., an analog controller with a feedback loop to monitor the voltage). The present invention is not limited to a particular manner of measuring the load. The power supply voltage may be set once based on an initial measured load or may be updated dynamically, i.e., by measuring the load from time to time and updating the power supply voltage accordingly.

Figure 1:
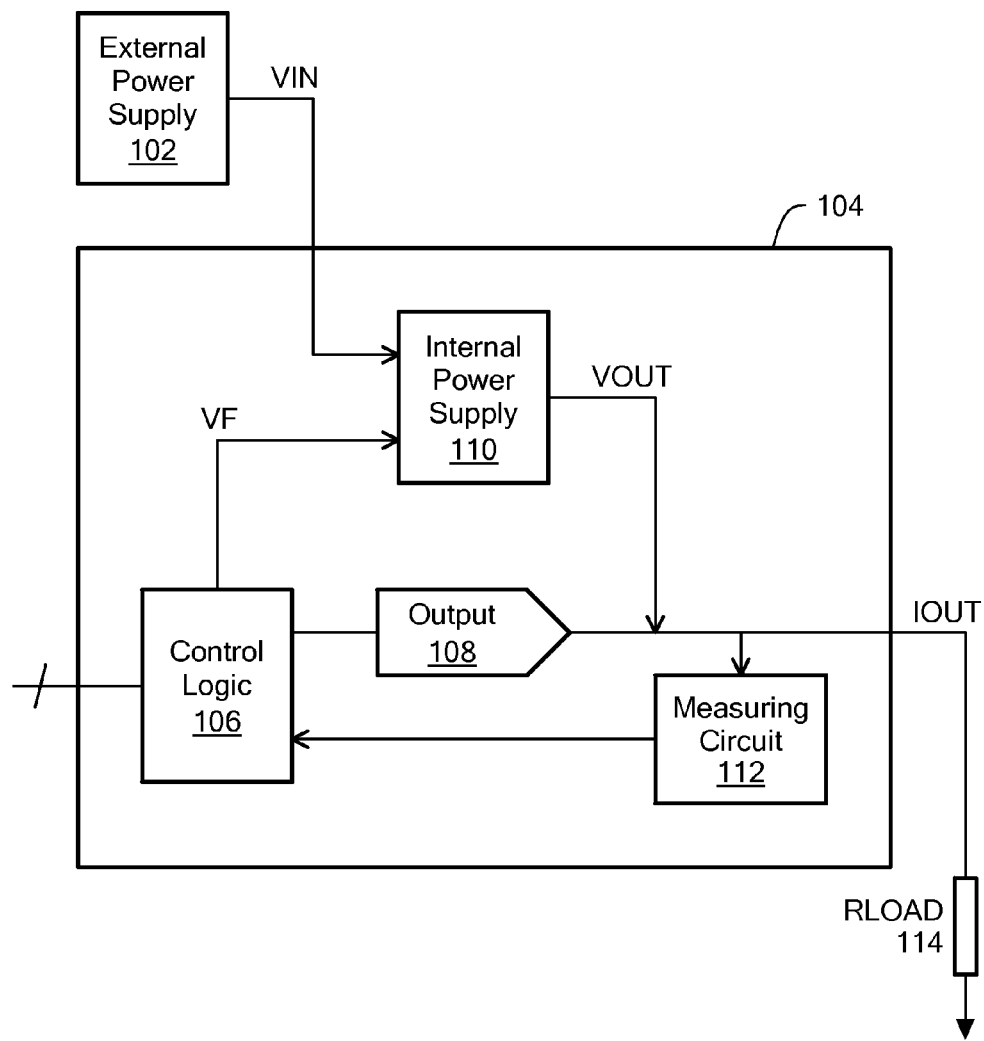
FIG. 1 is a schematic diagram of a power control system and device, in accordance with one exemplary embodiment.

FIG. 1 is a schematic diagram of a power control system and device, in accordance with one exemplary embodiment. The system includes a converter 104 and a power supply 102 external to the converter 104. The converter 104 includes, among other things, control logic 106, output 108, internal power supply 110 (e.g., a DC-DC boost converter, a buck converter, or other DC-DC converter), and measuring circuit 112. The measuring circuit 112 may include, for example, an analog-to-digital converter (ADC). The output 108 may include, for example, a digital-to-analog converter (DAC).

In order to measure the remote load 114, the control logic 106 controls the output 108 to drive the remote load 114 with a predetermined current (IOUT) and receives measurements from the measuring circuit 112 (e.g., voltage measurements). Based on the measurements from the measuring circuit 112 and the known predetermined current output (IOUT), the control logic 106 determines the remote load RLOAD 114 and dynamically adjusts the voltage supplied by the internal power supply 110 (via the control signal VF) to produce the desired output compliance voltage VOUT. As discussed above, from time to time (e.g., every X milliseconds, where X may be a fixed value and may be different for different implementations), the control logic 106 may re-measure the load and dynamically adjust the output compliance voltage accordingly.

Figure 2:
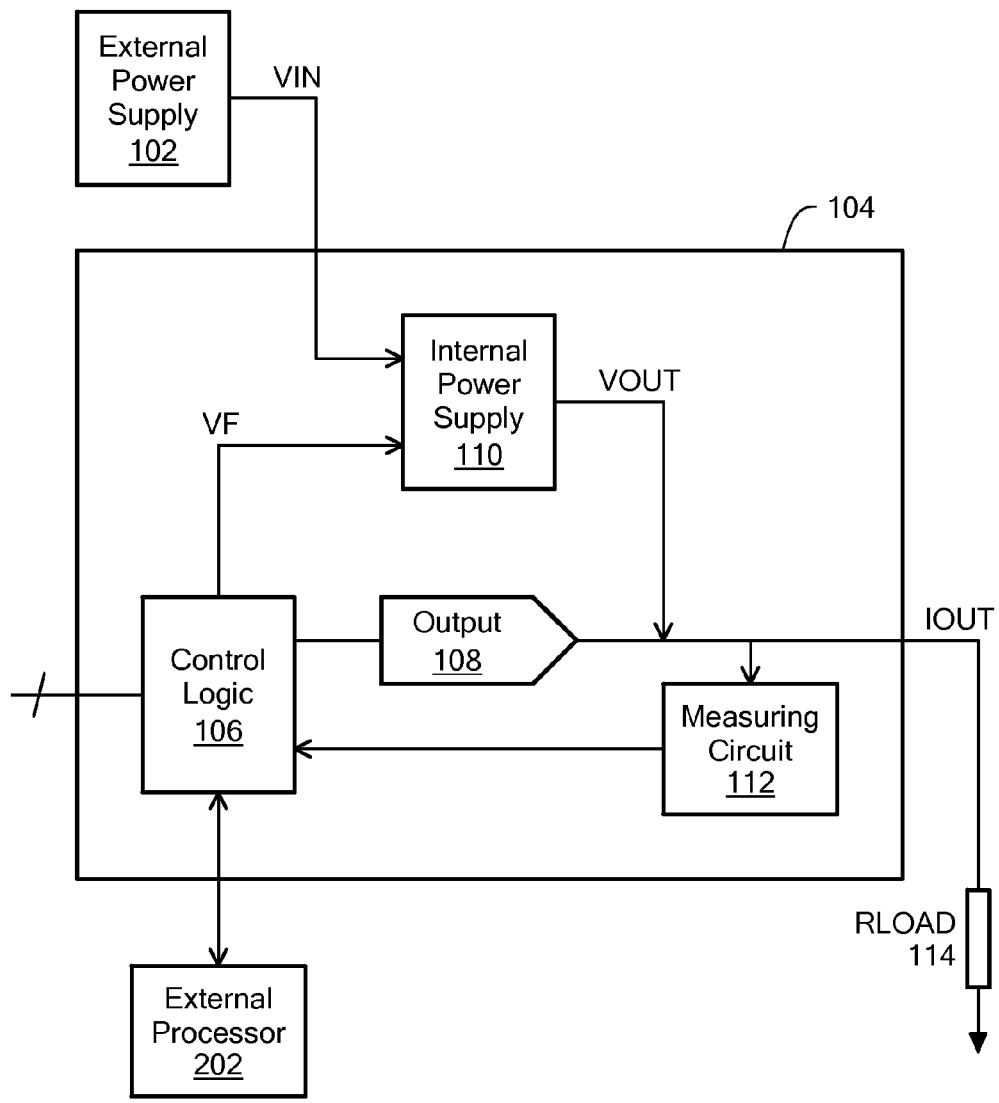
FIG. 2 is a schematic diagram of a power control system and device having an external processor, in accordance with yet another exemplary embodiment.

FIG. 2 is a schematic diagram of a power control system and device, in accordance with another exemplary embodiment. Here, an external processor 202 coupled to the control logic 106 is able to program the output compliance voltage VOUT via the control logic 106, for example, by reading measurement information from the control logic 106, computing the desired output compliance voltage VOUT, and programming the control logic 106 to produce the desired output compliance voltage VOUT (e.g., by storing a value in the control logic 106 that is used to set the output compliance voltage VOUT via the control signal VF). As discussed above, from time to time (e.g., every X milliseconds, where X may be a fixed value and may be different for different implementations), the external processor 202 may re-measure the load and dynamically adjust the output compliance voltage accordingly. The external processor 202 may be part of a user device in which the converter 104 is used, such that the output compliance voltage VOUT becomes a user-programmable parameter.

Figure 3:
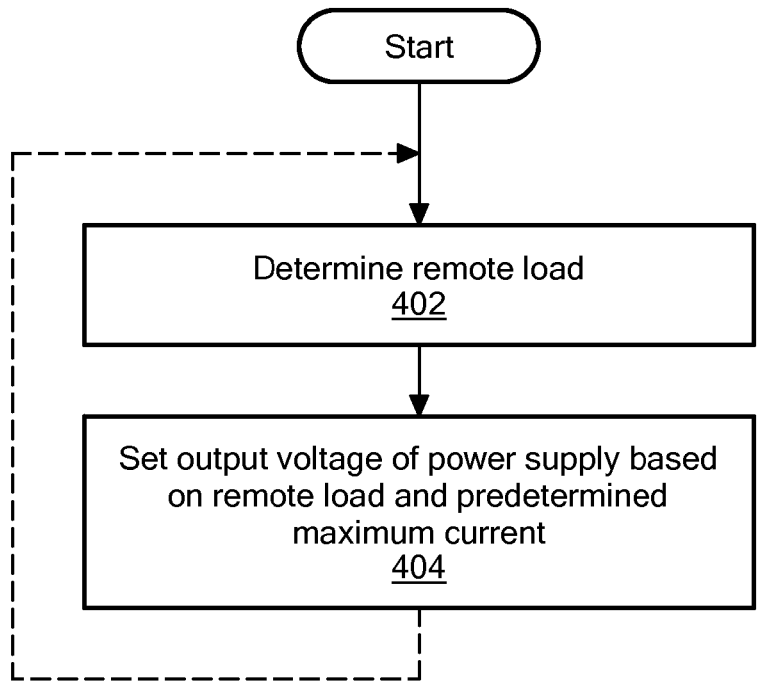
FIG. 3 is a logic flow diagram for controlling the output voltage based on the remote load, in accordance with an exemplary embodiment of the present invention.

FIG. 3 is a logic flow diagram for controlling the output compliance voltage based on the remote load such as by control logic 106 shown in FIG. 1 or by similar control logic of the external processor 202 shown in FIG. 2, in accordance with an exemplary embodiment of the present invention. In block 402, the control logic determines the remote load being driven. In block 404, the control logic sets the output compliance voltage of the power supply based on the remote load and a predetermined maximum current. The control logic optionally repeats the steps of determining the remote load and dynamically setting the output voltage of the power supply, as indicated by the dashed arrow from block 404 back to block 402.

Figure 4:
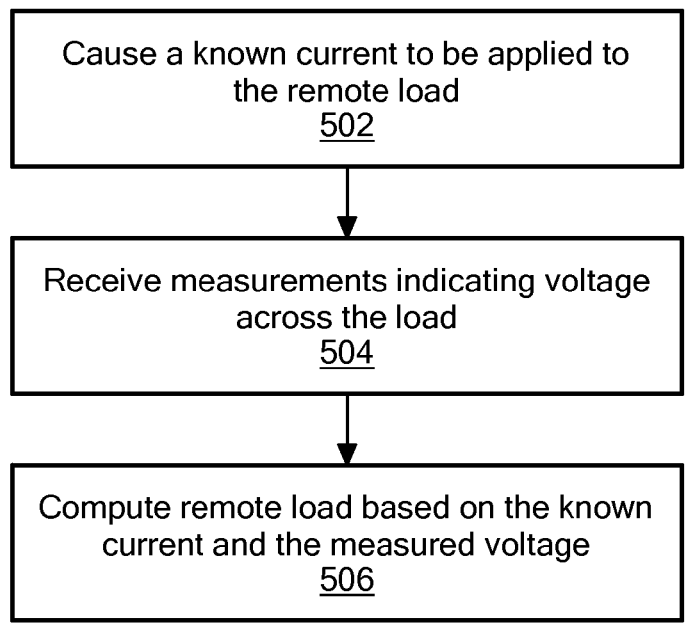
FIG. 4 is a logic flow diagram for determining the remote load pursuant to FIG. 3, in accordance with a specific exemplary embodiment of the present invention.

FIG. 4 is a logic flow diagram for determining the remote load pursuant to block 402 in FIG. 3, in accordance with a specific exemplary embodiment of the present invention. In block 502, the control logic causes a known current to be applied to the remote load. In block 504, the control logic receives measurements indicating the voltage across the remote load. In block 506, the control logic computes the remote load based on the known current and the measured voltage.

For convenience, the control logic 106 and the external processor 202 may be referred to generically as a controller. The controller may include analog and/or digital circuitry and may perform any or all of the functions of causing the current output across the remote load, measuring or receiving measurements of voltage across the remote load produced by the current, determining the remote load based on the current out and the measured voltage, and dynamically setting the output voltage of the power supply. Thus, for example, the controller may include the measuring circuit from which voltage measurements are derived.

It is contemplated that, in certain embodiments, the controller and measuring circuit, such as the control logic 106 and measuring circuit 112 described with reference to FIG. 1, will be included in a converter similar to the AD5755 chip sold by Analog Device, Inc. of Norwood, Mass. Thus, an existing device may be modified to include the type of output voltage control discussed herein, or an entirely new device may be produced with the type of output voltage control discussed herein.

Figure 5:
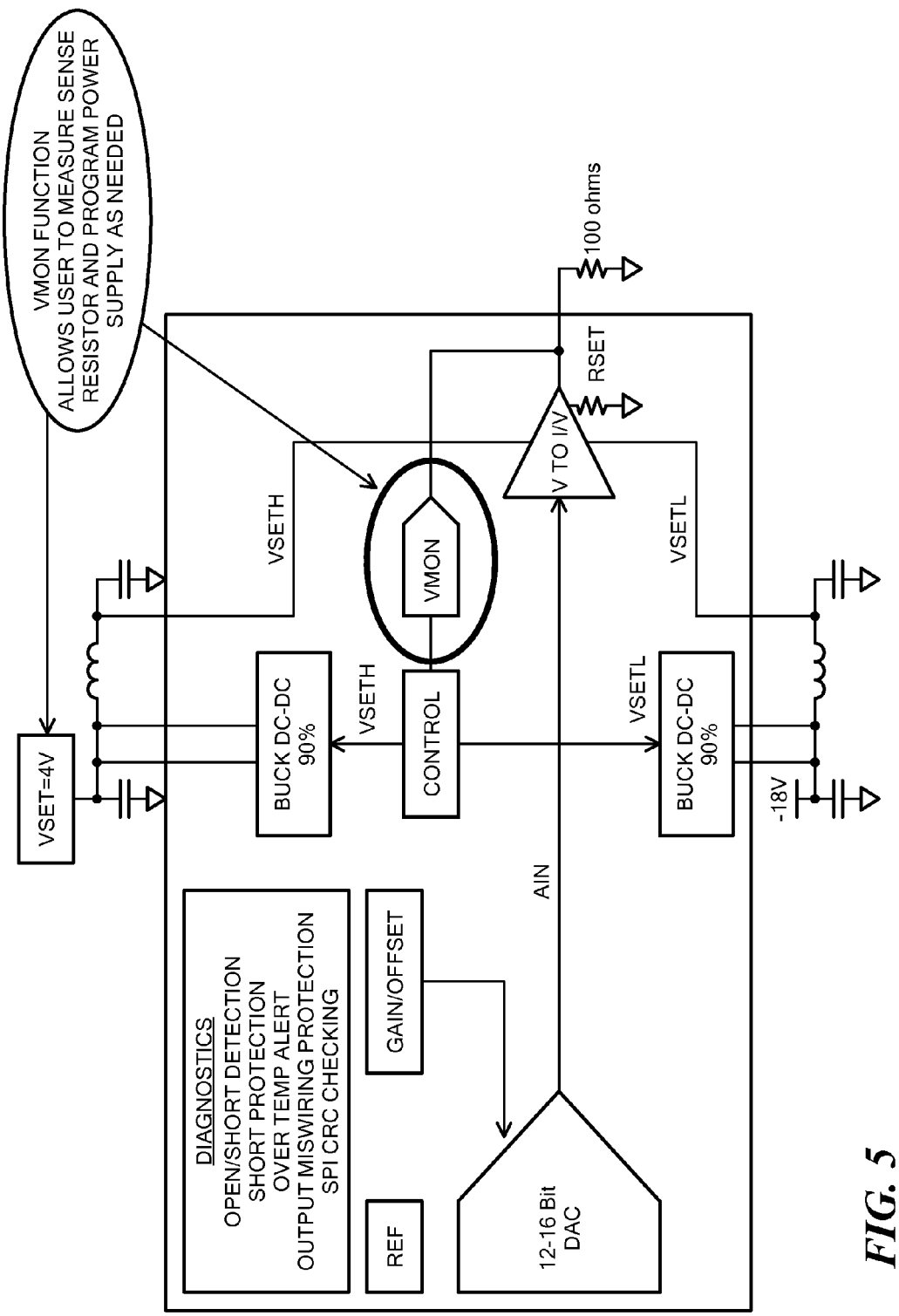
FIG. 5 is a schematic diagram showing relevant logic blocks for a power controller chip in accordance with a specific exemplary embodiment.

FIG. 5 is a schematic diagram showing relevant logic blocks for a converter in accordance with a specific exemplary embodiment. Here, the VMON block allows the control block to measure the sense resistor (indicated in the drawing as 100 ohms as but an example) and to then program the power supply as needed (indicated in the drawing as VSET=4V, i.e., VOUTmin=IOUTmax× RLOADact=20 mA×100 ohm=2V; VSET=VOUTmin+ headroom=4V). As discussed above, the control block may (and typically will) monitor the load from time to time and adjust the power supply as needed (e.g., either dynamically or user-programmable). In this way, the power supply dynamically follows the load resistor as opposed to the output compliance voltage, such that the supply only changes if the load changes, and settling time is substantially reduced compared to a fully dynamic power supply arrangement that tracks the changes in voltage.

It should be noted that, while the measuring circuit 112 discussed above with reference to providing voltage measurements to the controller so as to allow the controller to determine the remote load, in various alternative embodiments, the measuring circuit 112 may measure the remote load itself and may provide a load measurement to the controller.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A converter for controlling an output voltage of a power supply, the converter comprising:
a measuring circuit; and
a controller in communication with the measuring circuit, the controller configured to determine a first remote load resistance value for a remote load coupled to the converter based on a first known current output applied to the remote load and measurements received from the measuring circuit, compute a first desired output voltage of the power supply based on the first determined remote load resistance value and a predetermined maximum current, and set the output voltage of the power supply to the first desired output voltage, the controller further configured to determine a second remote load resistance value for the remote load coupled to the converter based on a second known current output applied to the remote load and measurements received from the measuring circuit, compute a second desired output voltage of the power supply based on the second determined remote load resistance value and the predetermined maximum current, and set the output voltage of the power supply to the second desired output voltage, such that the output voltage of the power supply is changed based on a change of remote load resistance value of the remote load.

2. A converter according to claim 1, further comprising a current source, wherein the controller is configured to cause the current source to apply a known current to the remote load and to determine the remote load resistance value based on the known current and voltage measurements received from the measuring circuit.

3. A converter according to claim 1, wherein the measuring circuit includes an analog-to-digital converter configured to provide measurement values to the controller.

4. A converter according to claim 1, wherein the measuring circuit is configured to provide voltage measurements to the controller.

5. A converter according to claim 1, wherein the measuring circuit is configured to provide load resistance values to the controller.

6. A converter according to claim 1, further comprising the power supply.

7. A converter according to claim 6, wherein the power supply includes a DC-DC converter.

8. A converter according to claim 6, wherein the power supply includes a power regulator.

9. A converter according to claim 6, wherein the measuring circuit, the controller, and the power supply are on a single chip.

10. A converter according to claim 1, wherein setting the output voltage of the power supply includes storing a value used to control the power supply.

11. A converter according to claim 1, wherein the controller is further configured to repeatedly re-determine the remote load resistance value and set the output voltage of the power supply based on the re-determined remote load resistance value.

12. A converter according to claim 1, wherein the controller is further configured to interface with an external processor for at least one of providing measurement information to the external processor or receiving from the external processor a parameter used to control the power supply such that the output voltage is selectively user-programmable.

13. A method of setting a power supply output voltage for a remote load, the method comprising:
determining a first remote load resistance value for the remote load by a controller;

computing a first desired power supply output voltage by the controller based on the first determined remote load resistance value and a predetermined maximum current for the power supply;

setting the output voltage of the power supply to the first desired output voltage by the controller;

determining a second remote load resistance value for the remote load by the controller;

computing a second desired power supply output voltage by the controller based on the second determined remote load resistance value and the predetermined maximum current for the power supply; and setting the output voltage of the power supply to the second desired output voltage by the controller, such that the output voltage of the power supply is changed based on a change of remote load resistance value of the remote load.

14. A method according to claim 13, wherein determining the first remote load resistance value comprises:

applying a known current to the remote load;

measuring voltage across the remote load produced by the known current; and determining the first remote load resistance value based on the known current and the measured voltage.

15. A method according to claim 13, wherein determining the first remote load resistance value involves use of an analog-to-digital converter.

16. A method according to claim 13, wherein the power supply includes a DC-DC converter on a same chip as the controller.

17. A method according to claim 13, wherein the power supply includes a power regulator on a same chip as the controller.

18. A method according to claim 13, wherein setting the output voltage of the power supply includes storing a value used to control the power supply.

19. A method according to claim 13, further comprising:

repeatedly re-determining the remote load resistance value and setting the output voltage of the power supply based on the re-determined remote load resistance value by the controller.

20. A system for controlling an output voltage of a power supply, the system comprising:

a converter; and an external processor in communication with the converter, wherein at least one of the converter or the external processor is configured to determine a first remote load resistance value for a remote load coupled to the converter, compute a first desired output voltage of the power supply based on the first determined remote load resistance value and a predetermined maximum current, set the output voltage of the power supply to the first desired output voltage, determine a second remote load resistance value for the remote load coupled to the converter, compute a second desired output voltage of the power supply based on the second determined remote load resistance value and the predetermined maximum current, and set the output voltage of the power supply to the second desired output voltage, such that the output voltage of the power supply is changed based on a change of remote load resistance value of the remote load.

* * * * *